US010321621B2

(12) United States Patent
Barfels

(10) Patent No.: US 10,321,621 B2
(45) Date of Patent: Jun. 18, 2019

(54) ELECTRONIC LATCHING CIRCUIT

(71) Applicant: Deere & Company, Moline, IL (US)

(72) Inventor: Aaron L. Barfels, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 227 days.

(21) Appl. No.: 15/234,427

(22) Filed: Aug. 11, 2016

(65) Prior Publication Data

US 2018/0042167 A1 Feb. 15, 2018

(51) Int. Cl.
| | | |
|---|---|---|
| A01C 7/20 | (2006.01) |
| F15B 11/08 | (2006.01) |
| A01B 63/10 | (2006.01) |
| F15B 11/10 | (2006.01) |
| G01L 9/00 | (2006.01) |
| A01B 63/11 | (2006.01) |

(52) U.S. Cl.
CPC .......... *A01B 63/1013* (2013.01); *A01C 7/205* (2013.01); *F15B 11/10* (2013.01); *G01L 9/00* (2013.01); *A01B 63/11* (2013.01); *F15B 11/08* (2013.01); *F15B 2211/351* (2013.01); *F15B 2211/6306* (2013.01); *F15B 2211/7053* (2013.01)

(58) Field of Classification Search
CPC .. F15B 11/167; F15B 1/10; F15B 2211/6306; A01B 63/1018; A01B 63/11; G01L 9/00; A01C 7/205
USPC ............ 172/4, 315, 316, 452, 2, 3; 137/613; 91/308, 420, 433, 461, 547, 548
See application file for complete search history.

(56) References Cited

U.S. PATENT DOCUMENTS

| 6,135,694 | A | * | 10/2000 | Trego | ........................ | B66F 9/24 |
| | | | | | | 414/21 |
| 6,460,623 | B1 | * | 10/2002 | Knussman | ............. | A01B 63/11 |
| | | | | | | 111/926 |
| 8,056,465 | B2 | | 11/2011 | Carlz | | |
| 8,573,111 | B2 | | 11/2013 | Graham et al. | | |
| 2003/0150210 | A1 | * | 8/2003 | Shimada | ............... | E02F 9/2217 |
| | | | | | | 60/484 |
| 2006/0131040 | A1 | | 6/2006 | Barber | | |
| 2011/0253239 | A1 | * | 10/2011 | Graham | ............. | A01B 63/1013 |
| | | | | | | 137/613 |
| 2012/0031088 | A1 | * | 2/2012 | Takebayashi | ......... | E02F 9/2225 |
| | | | | | | 60/452 |
| 2013/0248212 | A1 | * | 9/2013 | Bassett | ................... | A01B 71/02 |
| | | | | | | 172/4 |

OTHER PUBLICATIONS

European Search Report issued in counterpart application No. 17180823.1 dated Jan. 8, 2018. (9 pages).

* cited by examiner

*Primary Examiner* — F Daniel Lopez
*Assistant Examiner* — Dustin T Nguyen
(74) *Attorney, Agent, or Firm* — Taft Stettinius & Hollister LLP; Stephen F. Rost

(57) ABSTRACT

A hydraulic circuit with electronic latching through valve assemblies to allow full control of ground engaging tools including raising, lowering, and providing regulated active down force pressure via a work vehicle valves with manual input while allowing a continuous pressure source to be used in parallel. Pressure transducers and electrically controlled valves along with an electric control circuit allow automatic switching between manual control and automatic control of the ground engaging tools.

12 Claims, 5 Drawing Sheets

ELECTRONIC LATCHING CIRCUIT

TECHNICAL FIELD

The present invention relates generally to agricultural implements and, more specifically, to a controlled active down force system with a hydraulic circuit that reduces heat buildup and minimizes fuel consumption.

BACKGROUND

In agricultural work vehicle, such as, an agricultural tractor, hydraulic systems which operate high capacity equipment typically generate a considerable amount of heat which must be dissipated. For example, an implement such as a large seeding tool with a hydraulically driven fan often includes an active hydraulic down force system which operates simultaneously with the fan. Many work vehicles include an additional output port, often referred to as a power beyond pressure port, which is connected to the hydraulically powered components on the implement, to provide additional hydraulic capacity.

During activation of the down force system, the hydraulic circuit must run in a high pressure standby condition. The selective control valve on the work vehicle is moved to an active position, such as the lower position, and as the down pressure control valve adjusts pressure to the implement cylinders the hydraulic pump receives a signal from the system indicating a stalled condition. The stall signal causes the pump to run at the high pressure condition which requires more power and generates more heat. When a large flow of oil is required by the implement, such as required by the fan, during the high pressure standby condition a large amount of hydraulic energy must be dissipated by valves in the system. This energy dissipation generates a large amount of heat energy. Under certain extreme temperature conditions, work vehicles with marginal hydraulic cooling systems may overheat.

A partial solution is provided in U.S. Pat. No. 8,056,465, commonly assigned with the present application and hereby incorporated by reference. There, additional valve components are configured into the active down force circuit to cause the tractor hydraulic system to operate below the stall or high pressure standby condition. A check valve connects the tractor power beyond supply line to the pressure reduction valve that is connected to the implement cylinder ends and controls down pressure. The tractor selective control valve (SCV) is then operated at load pressure in the float mode when the down force circuit is controlling implement down pressure. The circuit eliminates a stall signal to the hydraulic pump that otherwise would cause the pump to rise to the high, heat-producing stall pressure when operating in the active pressure mode. During implement lift, a check valve allows hydraulic flow from the cylinders to bypass the pressure reduction valve. The system therefore operates at lower pressure and lower power to produce less heat and increase fuel economy.

A load sensing system keeps the system pressure at the lowest possible level. The power beyond system provides an external load sense option. However, the power beyond system does not allow the operator to control its output. There is a need to supply an externally load-sensed pressure to the system while allowing the system to be controlled by a non-externally load-sensed selective control valve. To prevent load-sensed pressure from commanding pump flow during tractor engine startup, thus creating tractor starting issues under certain circumstances, it is necessary to prevent load sense signal pressure from being communicated to the tractor during engine startup. Since not all tractors are equipped with power beyond, it is also necessary to be able to operate the rockshaft cylinders and a down force circuit normally, without attaching to power beyond supply, power beyond return, or load sense lines to the circuit.

U.S. Pat. No. 8,573,111, commonly assigned with the present application and hereby incorporated by reference, provides a solution by adding automatic latching controlled by pilot operated hydraulic valves. However, in some instances, due to fluctuations in the hydraulic pressure, the latching can be inadvertently deactivated.

SUMMARY

A load sense connection is provided between the implement rockshaft cylinders and the load-sensed power source. However, to avoid work vehicle starting difficulty, a valve structure is provided in the power beyond fluid line to keep the fluid line closed when starting the work vehicle. This valve structure provides an electronic latching function that allows the load-sensed power source to be activated and deactivated depending on the SCV function. The load-sensed power source is activated when the rockshaft cylinder(s) is actuated to extend, and remains activated, or latched, when the SCV is returned to neutral. The load-sensed power source provides continuous fluid supply while shifting between the latched and unlatched position of the valve structure. The electronic latching is activated by a pressure signal from a pressure transducer. When a preset pressure is reached, the controller then electronically activates the latching function.

Various other embodiments are contemplated, within the scope of the discussion herein.

BRIEF DESCRIPTION OF THE DRAWINGS

The detailed description of the drawings refers to the accompanying figures in which.

Like reference symbols in the various drawings indicate like elements.

DETAILED DESCRIPTION OF THE DRAWINGS

The following describes one or more exemplary embodiments of the disclosed resilient tines, as shown in the accompanying figures of the drawings described briefly above. Various modifications to the example embodiments may be contemplated by one of skill in the art.

Figure 1:
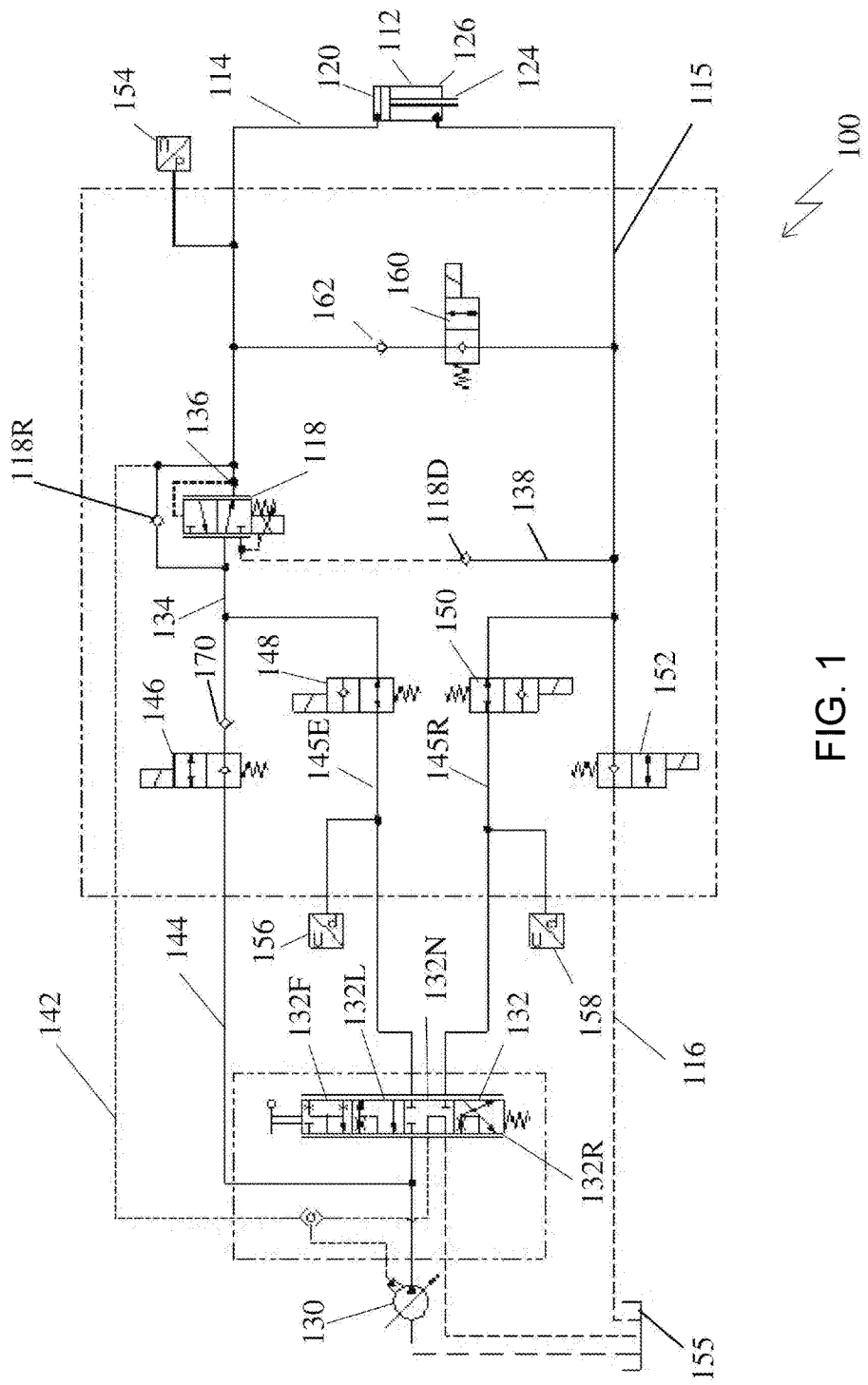
FIG. 1 illustrates hydraulic circuit diagram showing one implementation of the active down force system of the present disclosure.

FIG. 1 illustrates a hydraulic circuit 100 for a work vehicle, such as, an agricultural tractor, which includes one or more tool lift and down pressure cylinders 112 connected in parallel by lines 114 and 115. While one cylinder is shown, it will be understood that there may be varying number of cylinders which can be used, depending on the requirement. The cylinder 112 is used to raise and lower the tools as well as provide controlled down pressure to the associated tools, either directly or through a rockshaft (not shown). The hydraulic circuit 100 includes an adjustable pressure valve in the form of a pressure reducing/relieving valve 118 which regulates the pressure delivered to the cap end 120 of the cylinders 112. The work vehicle includes a source of hydraulic fluid under pressure, a load sense controlled pump 130, connected through a work vehicle selective control valve (SCV) 132 to inputs 134 and 138 of the pressure reducing/relieving valve 118. The pressure reducing/relieving valve 118 further has an output 136 connected to the line 114. The pressure reducing/relieving valve 118 is an electronically controlled proportional pressure reducing/relieving valve which regulates the pressure delivered to the cap end 120 of the cylinder 112. The pump 130 provides flow to the SCV 132 which controls the flow of fluid delivered to the rod end 124 of the cylinder for extending and retracting of the rods 124 of the cylinders 112. The SCV has four positions, a neutral position 132N, a tool lower position 132L, a tool raise position 132R and a float position 132F. A return check valve 118R allows flow to bypass the reducing/relieving valve 118 during cylinder retraction when the SCV 132 is in tool raise position 132R. A drain check valve 118D protects the pressure reducing/relieving valve 118 during retraction of cylinder 112.

The active down force pressure load is communicated to the load sense controlled pump 130 by load sense line 142. Fluid pressure for the active down force is provided through the fluid line 144 connecting the pump power beyond port to the input 134 of the pressure reducing/relieving valve 118. When the SCV 132 is in the tool lower position 132L, pressurized fluid from the pump 130 is supplied to an extend fluid line 145E. When the SCV is in the tool raise position 132R, pressurized fluid from the pump is supplied to the retract fluid line 145R.

Four two-way, two-position, electronically operated directional valves 146, 148, 150 and 152 provide an electronic latching function to the circuit. Valves 148 and 150 are normally open while valves 146 and 152 are normally closed. The operation of the directional valves 146, 148, 150 and 152 are controlled by pressure transducers 156 and 158 positioned in the circuit. An electronically operated regenerative valve 160 allows the hydraulic fluid from the rod end 124 of the cylinder 112 to flow to the cap side 120 of the cylinder 112. A check valve 162 is provided to prevent regulated oil from pressure reducing/relieving valve 118 from being communicated to the rod end 124 of the cylinder 112. The pressure reducing/relieving valve 118 is configured to operate based on inputs received from the pressure transducer 154. The pressure transducer 154 is configured to detect pressure deviation from a predefined pressure. The pressure reducing/relieving valve 118 in conjunction with the pressure transducer 154 provides the ability to remotely monitor and adjust the down pressure or to provide the ability to automatically maintain a set pressure or adjust the pressure based on a predefined pressure algorithm or prescription. Alternatively, the pressure levels of the pressure reducing/relieving valve 118 may be manually adjustable without electrical input provided to pressure reducing/relieving valve 118. A return check valve 118R allows flow to bypass the pressure reducing/relieving valve 118 during retraction of the cylinder 112. A drain check valve 118D is provided between the pressure reducing/relieving valve 118 and the directional valve 152 to protects the pressure reducing/relieving valve 118 during retraction of the cylinder 112.

The directional valve 146 is positioned in the power beyond fluid line 144. The direction valve 148, in turn, is positioned in the extend fluid line 145E. The directional valve 150 is positioned in the retract fluid line 145R while the directional valve 152 in positioned in the power beyond fluid return line 116. Thus, the directional valve 146 opens and closes fluid flow in the power beyond fluid line 144. When the cylinder 112 is fully extended, the fluid pressure increases at the cap end 120 of the cylinder 112. This pressure is sensed by the transducer 156. When a preset pressure is reached, the controller will activate the directional valves 146 and 152 open, connecting the power beyond pressure to the pressure reducing/relieving valve 118 and the power beyond return port to the rod ends 126 of the cylinder 112. Simultaneously, the directional valves 148 and 150 are closed and the regenerative valve 160 is opened. When the SCV 132 is in neutral position 132N, the directional valves 146 and directional valve 152 remain open. This allows the cylinders to extend and retract as the external load on the tools require and as the down force pressure allows.

When the SCV 132 is actuated to the tool lower position 132L, the load sense controlled pump 130 supplies fluid to the cap end of the cylinder 112 to extend the cylinder 112. When the tool contacts the ground, the pressure in the extend fluid line 145E increases. Thereafter, the pressure transducer 156 in the extend fluid line 145E senses a preset threshold pressure for latching. Once the latching conditions are reached in the tool lower position 132L, the controller activates the directional valves 146, 148, 150 and 152 and the regenerative valve 160.

When the SCV 132 is actuated to the tool raise position 132R in order to retract the cylinder 112, pressure builds in the retract fluid line 145R as the flow path is blocked by the closed directional valve 150. The pressure build-up in the retract fluid line 145R is sensed by the retract pressure transducer 158. As the pressure in the retract fluid line 145R reaches the preset threshold pressure for unlatching, the controller deactivates directional valves 146, 148, 150 and 152 and the regenerative valve 160. Thereafter, the SCV 132 controls the retraction action of the cylinder 112. Pressurized fluid flows from the pump, through the SCV to the line 145R and through the directional valve 150. From there, fluid flows to the rod end of the cylinder 112 to retract the rod. Return oil flows through the line 114 and check valve 118R to bypass the pressure reducing/relieving valve 118. From there through the line 145E, through the SCV and back to the tank 155.

Electrically powered directional valves 146, 148, 150 and 152 switch the hydraulic power source 130 to supply fluid between the SCV 132 at the extend fluid line 145E, the retract fluid line 145R and power beyond fluid line 144 and the power beyond fluid return line 116. The directional valves 148 and 150 are normally open valves to ensure the neutral state of circuit and allow for normal operation of the circuit via the SCV 132. The directional valves 146 and the directional valves 152 are normally closed to prevent oil from being supplied or drained from the circuit when the SCV 132 is in the neutral state. Check valve 170 prevents circuit oil from feeding back into the power beyond supply circuit. The regenerative valve 160 allows fluid to flow to the rod end 124 of the cylinder 112 to flow to the cap end 120 of the cylinder 112. The check valve 162 prevents regulated oil from the pressure reducing/relieving valve 118 from being communicated to the rod end 124 of the cylinder 112.

In operation, when the work vehicle is started, the pump 130 is driven by the engine. At this stage, the directional valve 146 is closed. Therefore, fluid flow through the power beyond line 144 is restricted. After the SCV 132 is actuated to move to the a tool lower position 132L, fluid flows through the SCV 132 to the cylinder 112 via the directional valve 148 and the pressure reducing/relieving valve 118. This flow of the hydraulic fluid caused the cylinder 112 to extend. As the cylinder 112 extends and the tools contact the ground, pressure builds up in the extend fluid line 145E until the pressure reaches a set threshold pressure of the transducer 156. Thereafter, a controller communicating with the pressure transducers 154, 156 and 158, energizes the solenoids on the directional valves 146, 148, 150 and 152 based on the signal from the pressure transducer 156. This closes the directional valves 148 and 150 while opening the directional valves 146 and 152. When the directional valve 146 is open, fluid flows from the pump 130 via the Power Beyond line 144, through the pressure reducing/relieving valve 118 to the cylinder 112 while the oil from the rod end 126 returns to an oil sump through the Power Beyond return line 116.

In case of undulations on the fields, when the tool goes over a trough portion in the field, the fluid will flow into the cap end 120 of the cylinder 112, thereby pushing the tool down to the lower ground. The fluid flows out from the rod end 126 and returns to the oil sump through the Power Beyond return line 116. However, in the event of a rapid extension of one or more cylinders 112, the oil pressure in the cap end 120 and the line 114 may fall below the pressure in the rod end 126. In this case, the oil will flow from the line 115 through the regeneration valve 160 and into the line 114. The regenerative valve 160 is optional and can be deleted and not affect the functioning of the electronic latching of the Power Beyond for active down force control. On the other hand, when there is crest portion on the ground, the rod 124 of the cylinder 112 is pushed upward by the opposing force from the ground. This causes back pressure in the pressurized fluid in the cap end 120 of the cylinder 112. This pressure is communicated back to the pressure reducing/ relieving valve 118. As this pressure increases beyond the set pressure of the pressure reducing/relieving valve 118, the pressure reducing/relieving valve 118 is pilot actuated to release the pressurized fluid in the cap end 120 of the cylinder 112 to flow through a check valve 118D to the Power Beyond return line 116.

Figure 5:
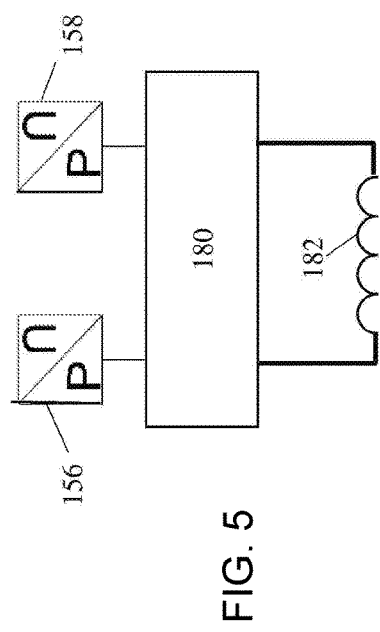
FIG. 5 is a control system schematic.
Figure 6:
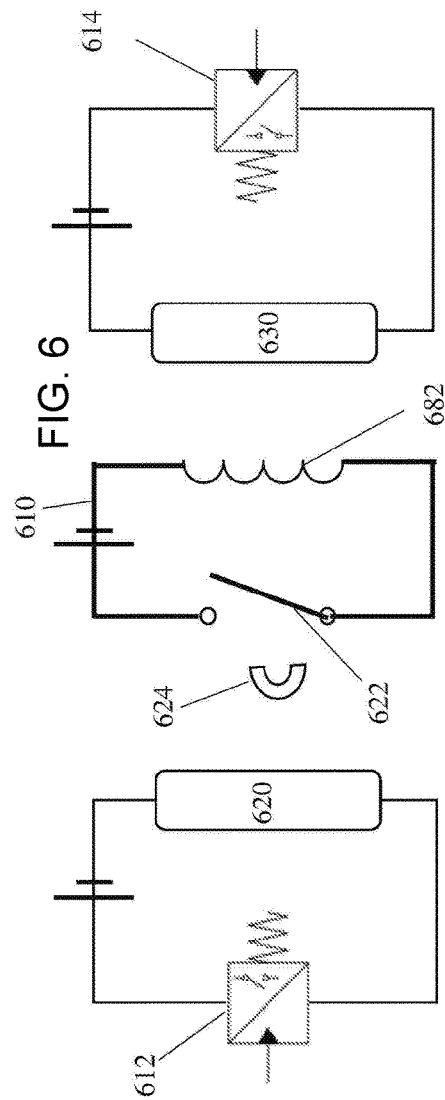
FIG. 6 is a schematic of an alternative embodiment of the control system.

A control system schematic is shown in FIG. 5. The extend pressure transducer 156 and the retract pressure transducer are electronically coupled to the controller 180. When the pressure sensed by the transducer 156 reaches the preset threshold pressure, the controller will activate the coils 182 of the directional valves 146, 148, 150 and 152 and of the regenerative valve 160. An alternative embodiment of the control system is shown in FIG. 6. In this control system, a latching relay 610 is used in conjunction with a pressure switch 612 in the extend pressure line 145E and a pressure switch 614 in the retract pressure line 145R of the hydraulic circuit. When the extend pressure reaches the pressure switch 612 trip setting, the switch closes. This energizes coil 620 of the relay which closes switch 622 in the relay circuit 610. The coils 682 of the directional valves 146, 148, 150 and 152 and of the regenerative valve 160, which are in series with the relay switch 622, are now connected to the voltage source. The relay switch 622 is held closed via a permanent magnet 624 or by some other latching means regardless of the state of the extend pressure switch 612. The relay switch 622 remains closed until coil 630 of the latching relay is energized. Coil 630 is energized when the retract line 145R pressure reaches the trip setting of the pressure switch 614 and the pressure switch is closed. The energized coil 630 overcomes the permanent magnet 624 to open the switch 622. The valve coils 682 are then disconnected to the voltage source and de-energize as a result. An additional switch can be placed in series with the coil 630 voltage source to allow the operator to disable the electrical circuit and operate the hydraulic circuit with only the SCV.

Figure 2:
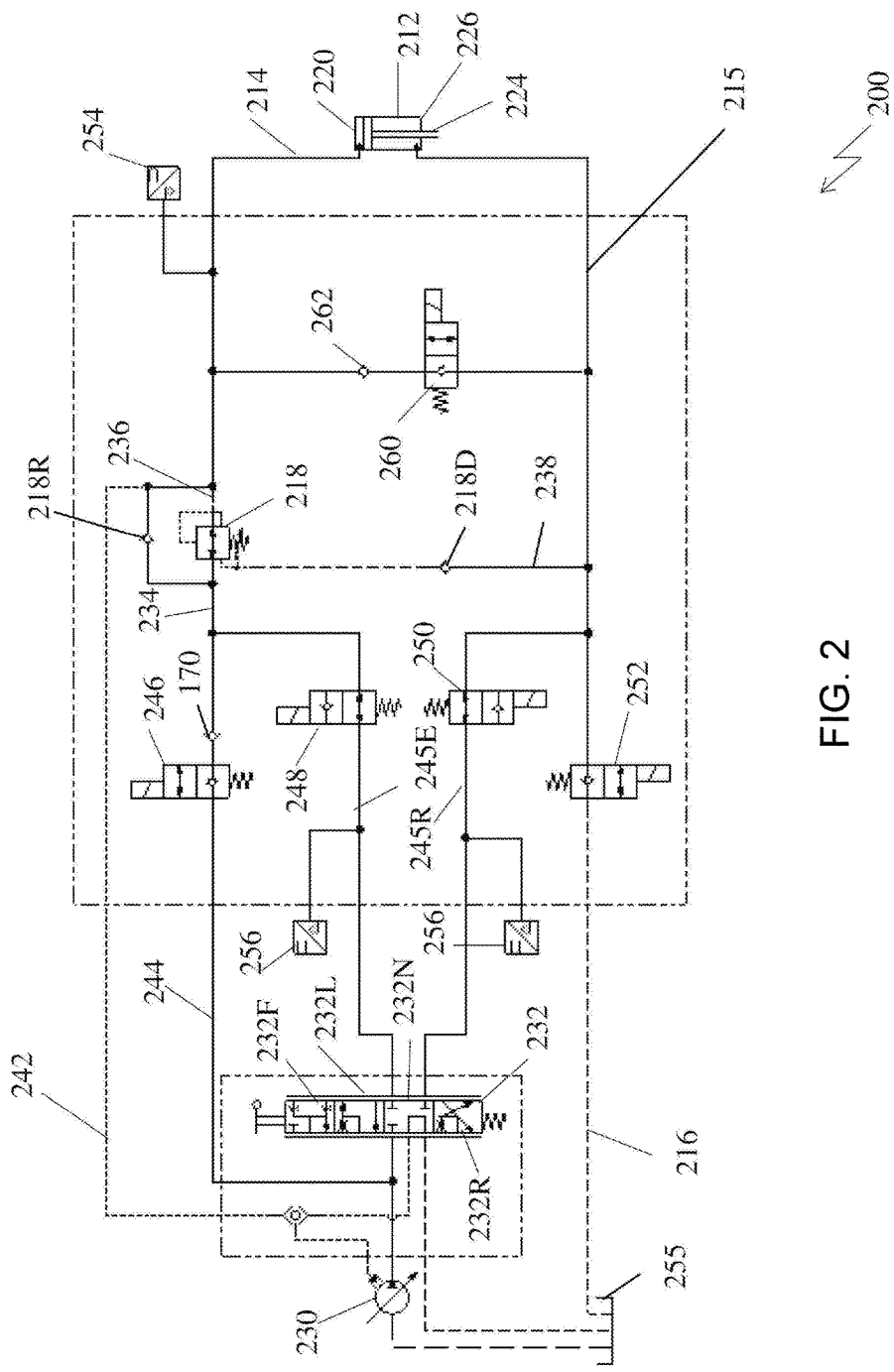
FIG. 2 illustrates another embodiment of the hydraulic circuit diagram illustrated in FIG. 1.

An alternative embodiment 200 is shown in FIG. 2. Here, elements similar or identical to elements in the circuit 100 are given reference numbers beginning with a 2 instead of a 1. Circuit 200 is similar to circuit 100 except the pilot operated pressure reducing/relieving valve 218 is used instead of solenoid operated pressure reducing/relieving valve 118.

Figure 3:
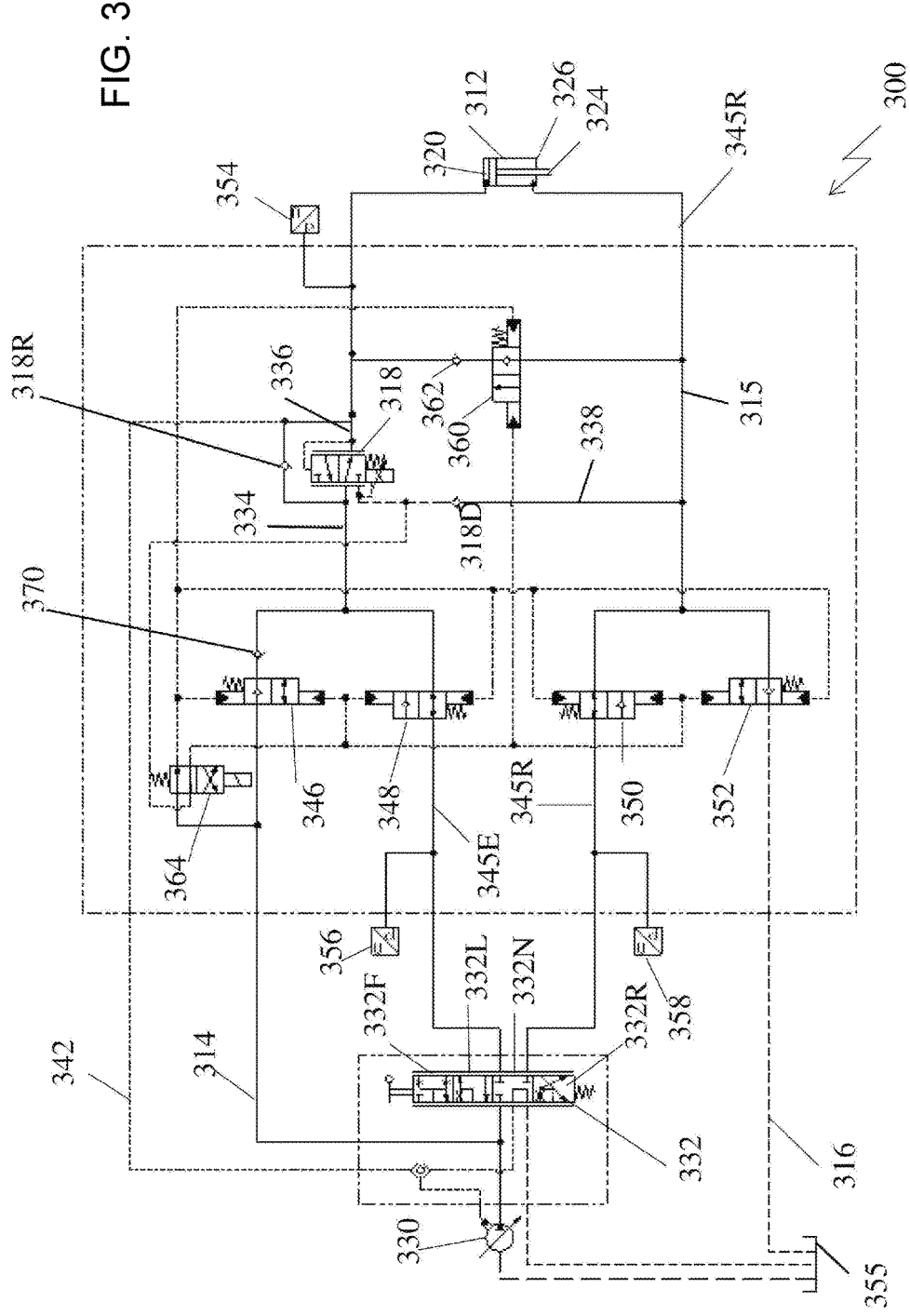
FIG. 3 illustrates an embodiment of the hydraulic circuit diagram illustrated in FIG. 1 with an electrically operated valve to generate hydraulic pilot signal.

FIG. 3 illustrates another alternate circuit 300. Here elements similar or identical to elements in the circuit 100 are given reference numbers beginning with a 3 instead of a 1. Circuit 300 is similar to circuit 100 except the latching function is achieved by pilot operated directional valves 346, 348, 350 and 352 and a pilot operated regenerative valve 360 instead of electrically operated directional valves 146, 148, 150 and 152 and the regenerative valve 160. Additionally, an electrically operated valve 364 is used to generate the hydraulic pilot pressure to the directional valves 346, 348, 350 and 352 and the pilot operated regenerative valve 360 for enabling circulation of the hydraulic fluid for extending and retracting the cylinder 312. The operation of the circuit 300 remains the same as that of the circuit 100 with pressure transducers 356 and 358 controlling the position of the valve 364.

Figure 4:
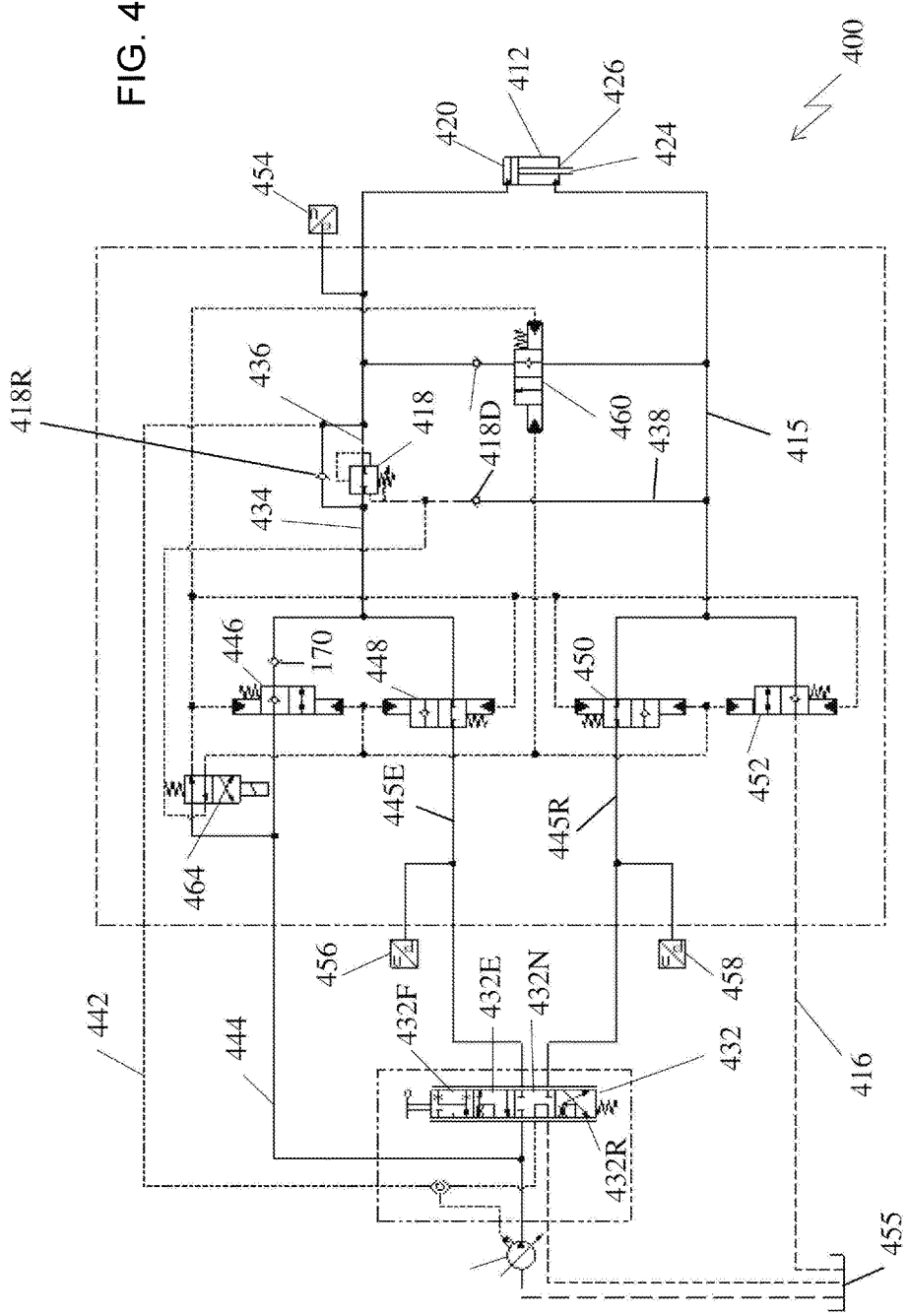
FIG. 4 illustrates another embodiment of the hydraulic circuit diagram illustrated in FIG. 3 with an electrically operated valve to generate hydraulic pilot signal.

FIG. 4 illustrates another alternate circuit 400. Here, elements similar or identical to elements in the circuit 100 are given reference numbers beginning with a 4 instead of a 1. Circuit 400 is similar to circuit 300 except the pilot operated pressure reducing/relieving valve 418 is used instead of solenoid operated pressure reducing/relieving valve 318.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. In one embodiment, the implement is detachable from the work vehicle while in another embodiment, the work vehicle and implement are combined in a single machine. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Accordingly, various embodiments and implementations other than those explicitly described are within the scope of the following claims.

What is claimed is:

1. An improvement in an active hydraulic down pressure system for an agricultural implement having down pressure cylinder structure and operable in an automatically controlled down pressure mode, the system adapted to be coupled to a source of hydraulic fluid under pressure through a multi-position selective control valve connected between the source and the down pressure system, the selective control valve having a neutral, a raise, a lower and a float position, the system also including:
   a cylinder structure,
   an adjustable pressure valve, having an input and an output, connected between the selective control valve and the cylinder structure for maintaining down pressure of the cylinder structure at a preselected level, and
   a fluid line connected to the fluid output on the source and to the input of the adjustable pressure valve, the fluid line providing a source of hydraulic fluid under pressure to the adjustable pressure valve independently of hydraulic fluid under pressure from the selective control valve so that the selective control valve is operable in the neutral position and the float position while the implement is operating in the automatically controlled down pressure mode,
   a load-sense line extending from the output of the adjustable pressure valve to the source of hydraulic fluid under pressure, and
   a valve in the fluid line for opening and closing the fluid line to fluid flow, the valve operable to close the fluid line until the cylinder structure is extended and the valve operable to open the fluid line when the cylinder structure is extended and to maintain the valve in the open position when the selective control valve is returned to the neutral position whereby the system is operated in the automatically controlled down pressure mode with the selective control valve in the neutral position, the improvement comprising:
   a first pressure sensor positioned between the selective control valve and the adjustable pressure valve to detect fluid pressure and operably connected to the valve to close the valve when the fluid pressure reaches a predetermined level.

2. The system as defined in claim 1 wherein the valve is an electronically operated directional valve responsive to the first pressure sensor.

3. The system as defined in claim 1 wherein the valve is a pilot controlled directional valve and further comprising an electronically operated second valve operable to deliver pilot pressure to the pilot controlled directional valve in response to the first pressure sensor.

4. The system of claim 1 further comprising a second pressure sensor in a retract fluid pressure line operable to close the valve when the fluid pressure in the retract fluid pressure line reaches a predetermined level.

5. The system as defined in claim 4 wherein the valve is an electronically operated directional valve responsive to the first pressure sensor.

6. The system as defined in claim 4 wherein the valve is a pilot controlled directional valve and further comprising an electronically operated second valve operable to deliver pilot pressure to the pilot controlled directional valve in response to the first pressure sensor.

7. The system as defined in claim 4 wherein the second pressure sensor is a pressure transducer.

8. The system as defined in claim 4 wherein the second pressure sensor is a pressure switch.

9. The system of claim 1 further comprising a feedback pressure transducer between the adjustable pressure valve and the cylinder structure to provide a pressure feedback signal.

10. The system as defined in claim 1 wherein the valve in the fluid line communicating fluid from the selective control valve is a normally open valve.

11. The system as defined in claim 1 wherein the pressure sensor is a pressure transducer.

12. The system as defined in claim 1 wherein the pressure sensor is a pressure switch.

* * * * *